United States Patent
Sultenfuss et al.

(10) Patent No.: US 9,658,670 B1
(45) Date of Patent: May 23, 2017

(54) FREE DEVICE PLACEMENT FOR WIRELESS CHARGING

(71) Applicant: Dell Products, L.P., Round Rock, TX (US)

(72) Inventors: Andrew Thomas Sultenfuss, Leander, TX (US); Vijay Thyagarajan Ramakrishnan, Atlanta, GA (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 14/995,033

(22) Filed: Jan. 13, 2016

(51) Int. Cl.
*G06F 1/28* (2006.01)
*G06F 1/26* (2006.01)
*H04B 5/00* (2006.01)
*H02J 7/02* (2016.01)

(52) U.S. Cl.
CPC ............... *G06F 1/266* (2013.01); *G06F 1/28* (2013.01); *H02J 7/025* (2013.01); *H02J 7/027* (2013.01); *H04B 5/0037* (2013.01)

(58) Field of Classification Search
CPC .... G06F 1/266; G06F 1/28; H02J 7/25; H02J 7/27
USPC ......................................................... 713/340
See application file for complete search history.

(56) References Cited

U.S. PATENT DOCUMENTS

| 2012/0052923 | A1* | 3/2012 | Park ........................ | H02J 7/025 455/567 |
| 2012/0280651 | A1* | 11/2012 | Toya ...................... | H02J 7/0027 320/108 |
| 2013/0311798 | A1* | 11/2013 | Sultenfuss .............. | H02J 7/025 713/310 |
| 2014/0002013 | A1* | 1/2014 | Kossi ...................... | H02J 7/025 320/108 |
| 2014/0002014 | A1* | 1/2014 | Sultenfuss .............. | H02J 7/025 320/108 |
| 2014/0125276 | A1* | 5/2014 | Lampinen ............... | H02J 5/005 320/108 |
| 2015/0263565 | A1* | 9/2015 | Amano ................... | H02J 7/025 320/108 |
| 2015/0365137 | A1* | 12/2015 | Miller ..................... | H02J 5/005 307/104 |
| 2016/0261120 | A1* | 9/2016 | Riehl ...................... | H02J 50/12 |

* cited by examiner

*Primary Examiner* — Vincent Tran
(74) *Attorney, Agent, or Firm* — Fogarty LLC

(57) ABSTRACT

Systems and methods for free device placement for wireless charging are described. In some embodiments, an Information Handling System (IHS) may include a processor; and a memory coupled to the processor, the memory having program instructions stored thereon that, upon execution by the processor, cause the IHS to: determine that the IHS is placed in a position on a wireless charging pad such that the wireless charging pad cannot provide power to the IHS above a minimum threshold value; request that the wireless charging pad provide fringe power to IHS without repositioning the IHS on the wireless charging pad, wherein the fringe power is smaller than the minimum threshold power level; and use the fringe power to indicate a problem or error to a user.

20 Claims, 6 Drawing Sheets

FREE DEVICE PLACEMENT FOR WIRELESS CHARGING

FIELD

This disclosure relates generally to Information Handling Systems (IHSs), and more specifically, to systems and methods for device placement for wireless charging.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

A wireless power delivery system typically includes a wireless charging pad upon which an IHS may be placed for charging. The IHS can communicate with the pad via near field communication (NFC) to indicate that the IHS available to receive power. The wireless power delivery system can then wirelessly transmit power to the IHS, for example, to charge an internal battery of the IHS.

SUMMARY

Embodiments of systems and methods for free device placement for wireless charging are described herein. In an illustrative, non-limiting embodiment, an Information Handling System (IHS) may include a processor; and a memory coupled to the processor, the memory having program instructions stored thereon that, upon execution by the processor, cause the IHS to: determine that the IHS is placed in a position on a wireless charging pad such that the wireless charging pad cannot provide power to the IHS above a minimum threshold value; request that the wireless charging pad provide fringe power to IHS without repositioning the IHS on the wireless charging pad, wherein the fringe power is smaller than the minimum threshold power level; and use the fringe power to indicate a problem or error to a user.

In the absence of the request, the wireless charging pad may provide no power to the IHS. The IHS of claim 1 may also include a battery coupled to the processor and to the memory, where the battery is configured to be charged by the wireless charging pad, and where the battery does not have sufficient energy stored therein to enable to IHS to indicate the problem or error to the user.

In some cases, determining that the wireless charging pad cannot provide power to the IHS above a minimum threshold value may include identifying a first amount of power output by the wireless charging pad, identifying a second amount of power received by the IHS, and determining that a ratio between the second and first amounts of power is under a minimum value. Requesting that the wireless charging pad continue to provide fringe power to IHS may include requesting that the wireless charging pad provide its maximum amount of available power to the IHS.

Using the fringe power may include lighting up a discrete visual indicator on the IHS that identifies a type of the problem or error to the user. Additionally or alternatively, using the fringe power may include making a sound by the IHS that identifies a type of the problem or error to the user. For example, the problem or error may include a display error. Additionally or alternatively, the problem or error may include a battery error. In some instances, the indication of the problem or error may include an indication that the IHS be repositioning on the wireless charging pad.

In another illustrative, non-limiting embodiment, a wireless power adaptor may include a power source and a wireless charging pad coupled to the power source, the wireless charging pad configured to: determine that an IHS is placed in a position on the surface of the wireless charging pad such that the IHS cannot receive power from the wireless charging pad above a minimum threshold value; receive a request to provide fringe power to IHS without repositioning the IHS on the wireless charging pad, where the fringe power is smaller than the minimum threshold power level; and provide the fringe power to the IHS in response to the request.

In some implementations, determining that the IHS cannot receive power above a minimum threshold value may include identifying a first amount of power output by the wireless charging pad, identifying a second amount of power received by the IHS, and determining that a ratio between the second and first amounts of power is under a minimum value. Providing the fringe power to the IHS may include requesting that the wireless charging pad provide its maximum amount of available power to the IHS.

The IHS may be configured to use the fringe power to (a) light up a discrete visual indicator on the IHS or to (b) make a sound that identifies a type of the problem or error to the user. The problem or error may include a display error, a processor error, or a battery error.

The wireless charging pad may be further configured to: provide an indication that the IHS be repositioned on the wireless charging pad while providing the fringe power; determine that the IHS has been repositioned on the surface of the wireless charging pad; and negotiate, with the IHS, another amount of power to be provided to the IHS that is above the minimum threshold value.

In yet another illustrative, non-limiting embodiment, a method may include, in response to a determination that an IHS is placed on a wireless charging pad in a position such that the wireless charging pad cannot provide power to the IHS above a minimum threshold value, allowing the wireless charging pad provide fringe power to IHS without repositioning the IHS on the wireless charging pad, where the fringe power is smaller than the minimum threshold power level; and using the fringe power, by the IHS, to indicate a problem or error to a user without using a monitor, where the IHS includes a battery that does not have sufficient energy stored therein to enable the IHS to indicate the problem or error to the user via the monitor.

The method may include determining that the IHS cannot receive power above a minimum threshold value by identifying a first amount of power output by the wireless charging pad, identifying a second amount of power received by the IHS, and determining that a ratio between the second and first amounts of power is under a minimum value; where providing the fringe power to the IHS includes providing, by the wireless charging pad, the maximum amount of power that can be provided by the wireless charging pad.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
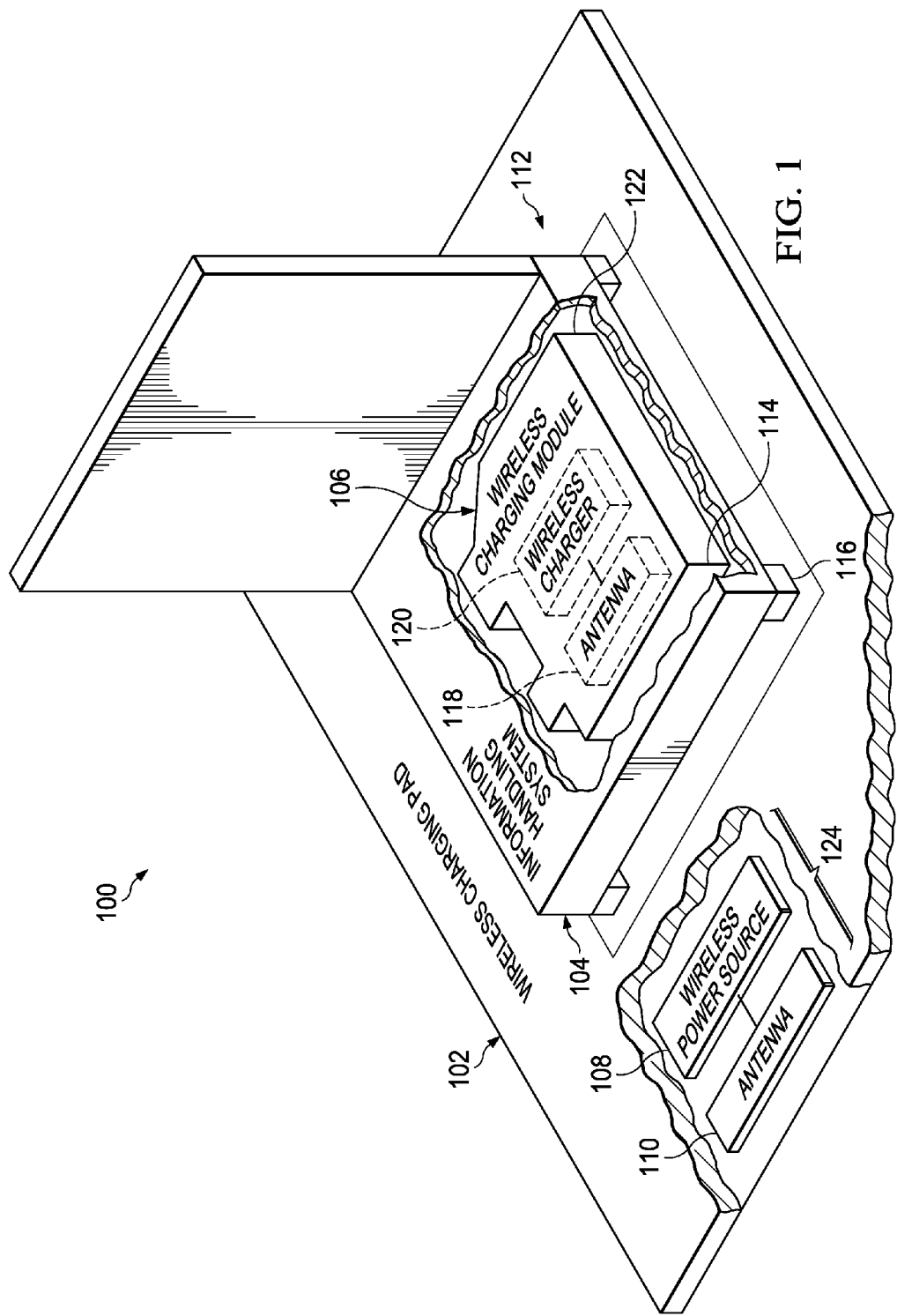
FIG. 1 is a block diagram of an example of a wireless power delivery system according to some embodiments.

FIG. 1 is a block diagram of an example of wireless power delivery system 100 according to some embodiments. For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Wireless power delivery system 100 includes wireless charging pad 102, IHS 104, and wireless charging module 106. Wireless charging pad 102 includes wireless power source 108, antenna or coil 110, and landing pad 112. IHS 104 includes optical drive bay 114 and pads 116. Wireless charging module 106 includes antenna or coil 118 and wireless charger 120. Wireless power source 108 is in communication with antenna 110 (which may be located near the center of charging pad 102 but is shown here near the edge for illustration purposes only), and which is in communication with antenna 118 of wireless charging module 106. Antenna 118 is in communication with wireless charger 120.

Figure 3:
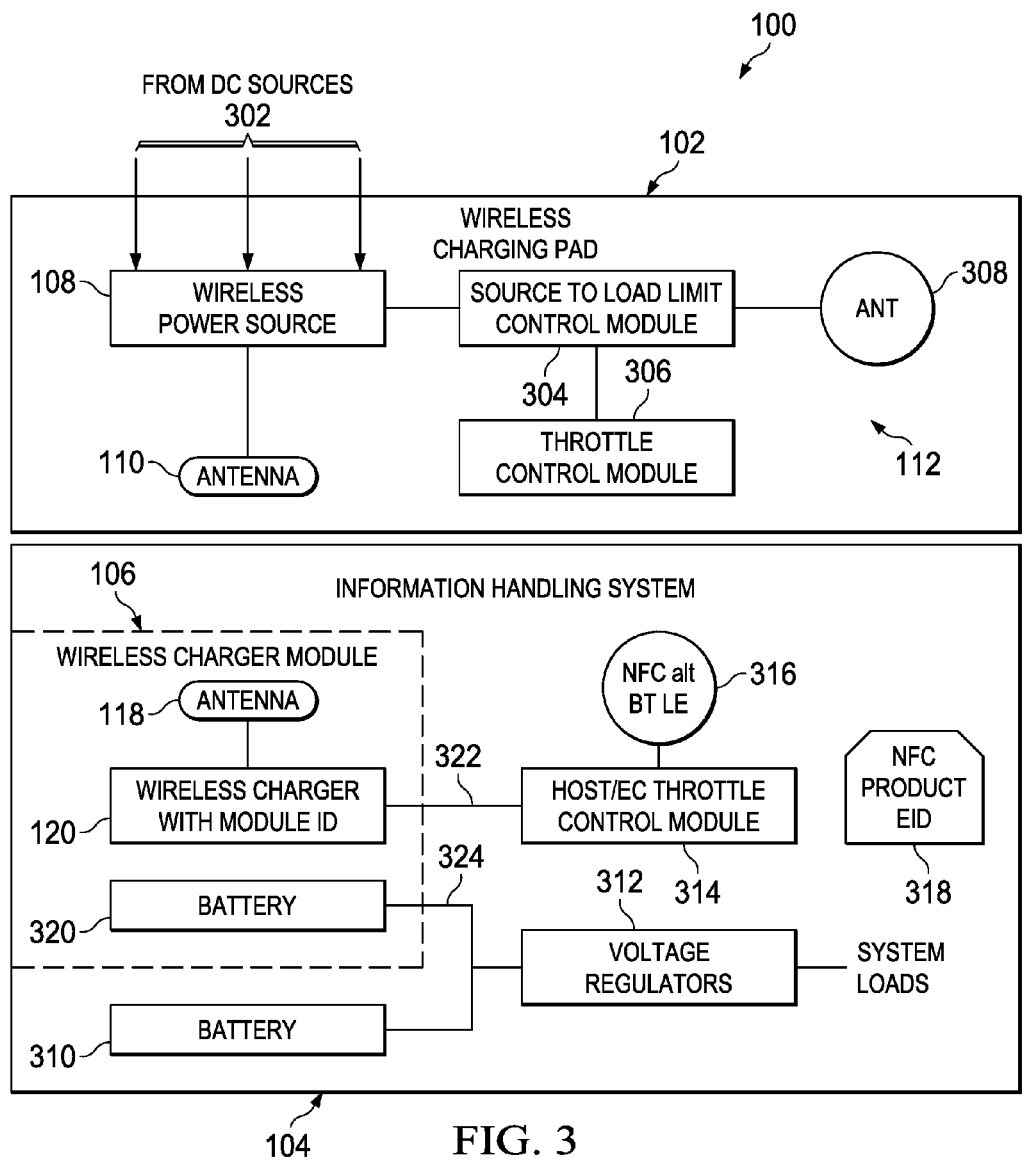
FIG. 3 is a block diagram illustrating additional implementation details of the wireless power delivery system according to some embodiments.

Wireless charging module 106 may be shaped to fit within a standard optical drive bay, such as optical drive bay 114 of IHS 104. Thus, wireless charging module 106 may be inserted into optical drive bay 114 of IHS 104, and may connect with the IHS via one or more buses. For example, wireless charging module 106 can connect with IHS 104 via serial advanced technology attachment (SATA) mini bus 322 (FIG. 3) to communicate with the IHS. Wireless charging module 106 may also connect with IHS 104 to provide power to the IHS via a high power connector 324 (FIG. 3).

When wireless charging module 106 is connected to IHS 104, wireless charger 120 may communicate with IHS 104 via the SATA mini bus 322 to provide information about the wireless charging module. For example, information may include a class of the wireless charging module 106, an amount of power that the wireless charging module can provide, a type of the wireless charging module, a maximum amount of voltage that the wireless charging module can provide, and the like. IHS 104 may use that information to detect whether wireless charging module 106 is compatible with a power system of IHS 104. When IHS 104 has determined that wireless charging module 106 is a compatible charging module, the IHS can sent the power system in a ready state to receive power from the wireless charging module.

Wireless charging pad 102 may detect when a device such as IHS 104 is placed on top landing pad 112 of the wireless charging pad, and may transmit a detect signal in response to detecting the IHS. For example, wireless charging pad 102 may detect IHS 104 when a light sensor on wireless charging pad 102 is covered by the IHS, by a pressure sensor of the wireless charging pad detecting the IHS, by metal tabs of the wireless charging pad being placed in physical communication with the IHS, etc.

IHS 104 may receive the detect signal from the wireless charging pad, and may respond by transmitting a presence signal to the wireless charging pad. The presence signal may include a repeating pulse signal, referred to as a chirp, and may also include information associated with IHS 104 and wireless charging module 106, such as a class of IHS and the class of the wireless charging module. The class of IHS 104 and the class of wireless charging module 106 can indicate a maximum power needed for the IHS, or the like. In an embodiment, landing pad 112 may be a designated location of wireless charging pad 102 with a specific orientation for IHS 104 so that the antennas 110 and 118 may align properly.

Wireless charging module 106 includes plastic bottom portion 122 of an enclosure of the wireless charging module. The remaining portions, such as front, back, left, right, and top portions, of the enclosure of wireless charging module 105 may be metal, plastic, or any other type of material capable of supporting and protecting the components located within the wireless charging module. The bottom portion of wireless charging module 106 may be plastic to enable antenna 118 of the wireless charging module to communicate with antenna 110 of wireless charging pad 102. Similarly, IHS 104 includes bottom portion 202, which in turn includes a non-metallic portion 204 (FIG. 2).

Figure 2:
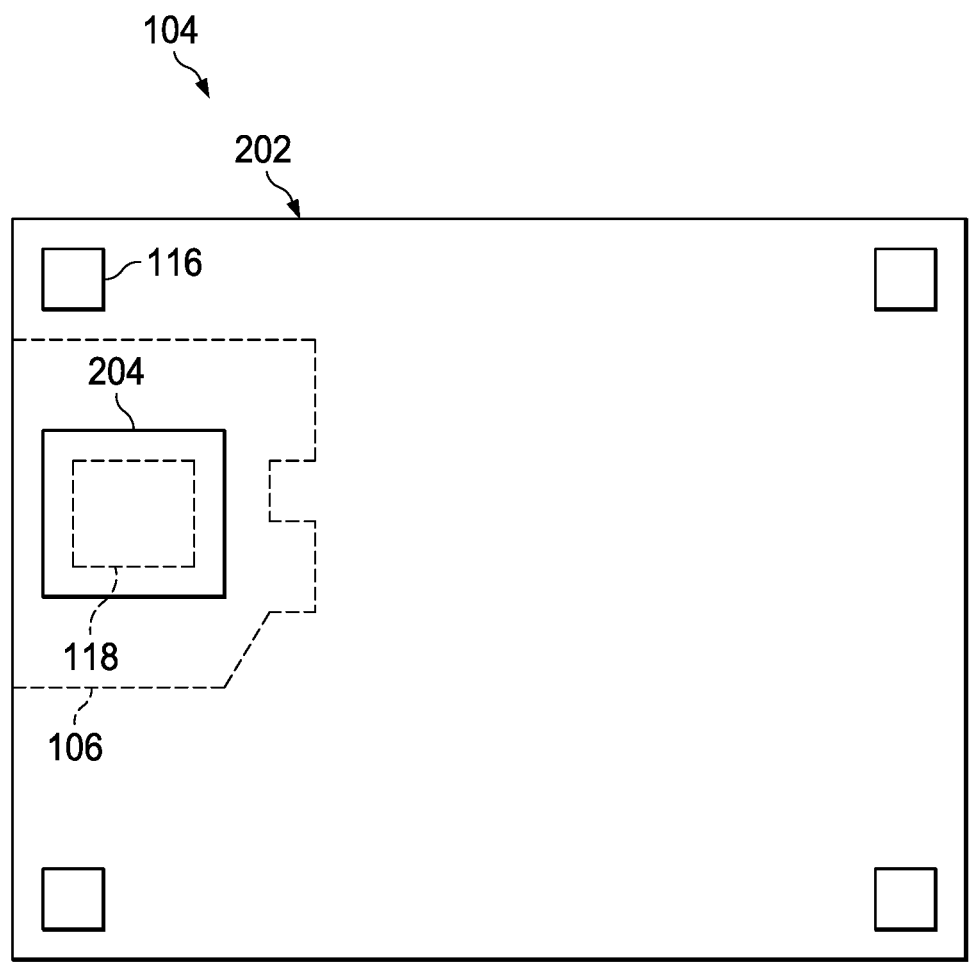
FIG. 2 is a block diagram of components within the wireless power delivery system according to some embodiments.

FIG. 2 is a block diagram of components within the wireless power delivery system according to some embodiments. As such, FIG. 2 shows IHS 104 including bottom portion 202, non-metallic portion 204, and pads 116. In an embodiment, an enclosure of IHS 104, including bottom portion 202, is a metal enclosure, such as a magnesium metal alloy. If the metal enclosure of IHS 104 is between antenna 118 of wireless charging module 106 and antenna 110 of wireless charging pad 102 of FIG. 1, the metal enclosure may be configured to prevent a power transfer between the two antennas.

Thus, non-metallic portion 204 of bottom portion 202 may be positioned so that the non-metallic portion is located below antenna 118 when wireless charging module 106 in inserted into IHS 104. The position of non-metallic portion 204 below antenna 118 can enable the antenna of wireless charging module 106 to communicate with antenna 110 of the wireless charging pad 102 without having interface from metal enclosure.

In different embodiments, non-metallic portion 118 may be substantially the same size as antenna 118, may be larger than the antenna but smaller that wireless charging module 106, may be substantially the same size as the wireless charging module, may be larger than the wireless charging module, etc. Non-metallic portion 204 may be composed of any material that does not affect the power transfer between antennas 110 and 118.

Referring back to FIG. 1, wireless charging pad 102 may receive the presence signal from IHS 104, and may then set an initial power level to be provided from wireless power source 108 to wireless charging module 106. The initial power level may be a minimum power level available from wireless charging pad 102, may be a maximum power level available from the wireless charging pad, or may be any power level in between the minimum and maximum power levels. Wireless charging pad 102 may then transmit the wireless power to wireless charging module 106 via antenna 110.

Wireless charging pad 102 may use one or more techniques to provide power wirelessly, including inductive techniques, resonant inductive techniques, capacitive transfer techniques, beamed power transfer, such as laser or microwave transfer, or the like. For purposes of discussion, however, it is assumed that wireless charging pad 102 transfers power wirelessly using inductive power transfer.

Plastic bottom portion 122 of wireless charging module 106, non-metallic portion 204 of IHS 104, and space 124 between antenna 110 and antenna 118 creates an air gap for the inductive power transfer between the two antennas. The amount of power needed to be transferred from antenna 110 to antenna 118 can vary based on space 124, which may be a calculated distance that is determined based on the height of the pads 116, the distance from bottom portion 202 of IHS 104 and bottom portion 122 of wireless charging module 106, and a distance between antenna 110 and the top of wireless charging pad 102. Antenna 118 of wireless charging module 106 may receive wireless power from the antenna 110 and may provide power to wireless charger 120, which in turn converts the power to be used by IHS 104.

IHS 104 may monitor its current operating conditions and determine whether to change a power state of IHS 104. For example, if IHS 104 is receiving the maximum amount of power from wireless charging pad 102 and then IHS 104 enters a lower power mode, IHS 104 can send a power state change signal to wireless charging pad 102. The power state change may indicate a new power state for IHS 104.

Wireless charging pad 102 may receive the power state change signal and may adjust the power level provided by wireless power source 108 to IHS 104, such that a proper power level is provided to IHS 104 without having excess power that is not used or not having enough power. IHS 104 may continually monitor its operating mode and provide any necessary state change signals to wireless charging pad 102.

FIG. 3 shows a more detailed embodiment of the wireless power delivery system 100 including wireless charging pad 102, IHS 104, and a plurality of direct current DC sources 302 according to some embodiments. Wireless charging pad 102 includes landing pad 112, which in turn includes source-to-load limit control module 304, throttle control module 306, antenna 308, wireless power source 108, and antenna 110. Antenna 110 is in communication with wireless power source 108. Wireless power source 108 is in communication with source-to-load limit control module 304, which in turn is in communication with throttle control module 306 and with antenna 308.

IHS 104 includes battery 310, voltage regulators 312, host/embedded controller (EC) throttle control module 314, near field communication (NFC) alternative Bluetooth Low Energy (BT LE) antenna 316, and NFC product Electronic Data Identification (EDID) tag 318. Wireless charging module 106 includes battery 320, antenna 118, and wireless charger 120. Antenna 118 is in communication with wireless charger 120, which in turn is in communication with host/EC throttle control module 314 via communication bus 322. Wireless charger 120 is also in communication with battery 320, with battery 310, and with voltage regulator(s) 312 via power connector 324. In an embodiment, power connector 324 may be a system management bus, and it may also include low power pins to provide power to logic components in wireless charging module 106.

Figure 6:
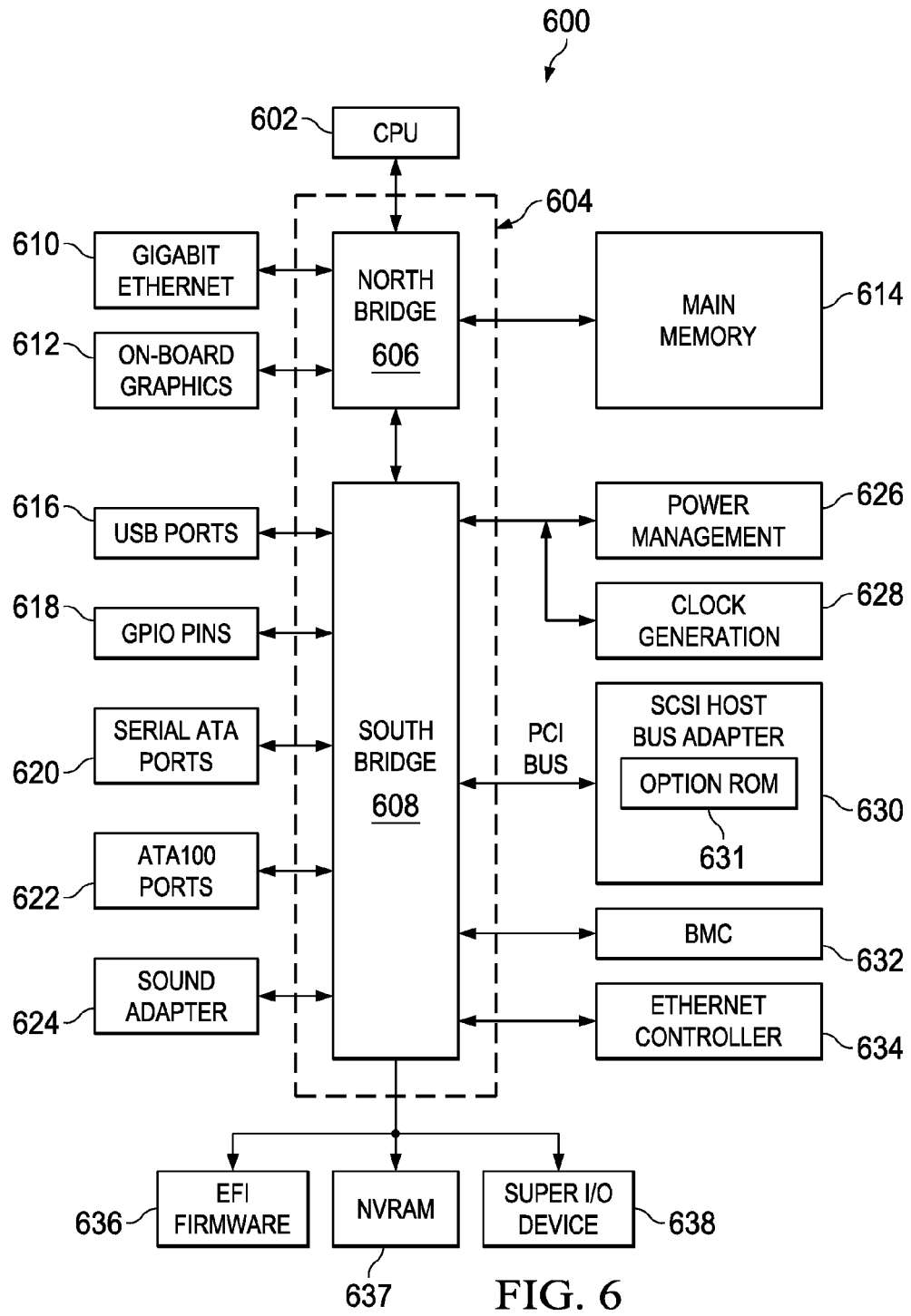
FIG. 6 is a block diagram of an example of an Information Handling System (IHS) configured to implement the systems and methods described herein according to some embodiments.

Voltage regulators 312 can provide multiple regulated voltages to different systems loads of IHS 104, such as a central processing unit, a memory, a display device, and the like (FIG. 6). Host/EC throttle control module 314 is in communication with NFC alternate BT LE antenna 316. Host/EC throttle control module 314 can be a hardware module, a software module, and/or any combination of a hardware and software module. For example, host/EC module 314 may be a power management integrated circuit, a power management unit, or the like. The plurality of DC sources 302 can include an automatic air source, an alternating current (AC)-to-DC source, and a universal serial bus (USB) power source, or the like.

When wireless charging module 106 is connected to IHS 104, wireless charger 120 can communicate with host/EC throttle control module 314 of IHS 104 to provide information about the wireless charging module. For example, information can include a class of the wireless charging module 106, an amount of power that the wireless charging module can provide, a type of the wireless charging module, and the like. Host/EC throttle control module 314 may use the information to detect whether wireless charging module 106 is compatible with a power system of IHS 104. When host/EC throttle control module 314 has determined that wireless charging module 106 is compatible with IHS 104, the host/EC throttle control module can set the power system of IHS 104 in a ready state to receive power from wireless charging module 106.

When IHS 104 containing wireless charging module 106 is placed within a NFC range of landing pad 112 of wireless charging pad 102, NFC product EDID tag 318 can transmit a presence signal, referred to as a chirp, to indicate that IHS 104 is within range of the wireless charging pad. The presence signal may be a repeating pulse that can be received by antenna 308, which in turn can provide the presence signal to source-to-load limit control 306. In some implementations, a presence signal from NFC tag 318 may also include information about wireless charging module 106, such as a class of the wireless charging module.

When source-to-load limit control module 304 receives the presence signal from antenna 308, the source-to-load limit control module determines whether another signal is received from throttle control module 306. If a signal is not received from throttle control module 306, source-to-load limit control module 304 may set an operation level of wireless charging pad 102 to an initial operation level, such as a minimum level. Source-to-load limit control module 304 may send the operation level to wireless power source 108, which may receive power from one of DC power sources 306.

Wireless power source 108 may then provide power to antenna 110, which in turn can wirelessly provide that power to antenna 118 of wireless charging module 106. Wireless charging pad 102 may use one or more techniques to provide power wirelessly, including inductive techniques, resonant inductive techniques, capacitive transfer techniques, beamed power transfer, such as laser or microwave transfer, etc. In some embodiments, plastic portion 122 (FIG. 1) of wireless charging module 106 and non-metallic portion 204 (FIG. 2) of IHS 104 can enable the power to be provided from antenna 110 to antenna 118 via inductive power transfer.

Antenna 118 may receive wireless power from the antenna 110, and may provide power to wireless charger 120. Wireless charger 120 may then convert power received from antenna 118 to a power level and a voltage level that can be utilized by IHS 104, such as, for example, 45 or 65 Watts and 19.5 volts.

Wireless charger 120 may supply the converted power to battery 310 and/or voltage regulators 312. The power provided to battery 310 may be used to charge the battery, and power provided to voltage regulators 312 may be supplied at a proper voltage to the remaining components of IHS 104. If battery 310 is fully charged and IHS 104 does not require the entire amount of power received by wireless charging module 106 from wireless charging pad 102, wireless charger 120 may provide the remaining power to the battery 320. The power provided to battery 320 may be used to charge the battery, which can be used as a secondary battery for IHS 104.

Host/EC throttle control module 314 can receive information about the power provided by wireless charging pad 102 from wireless charger 120. The information can include whether wireless charging pad 102 is compatible with the wireless charger converter, a total amount of power that the wireless charging pad is able to provide, or the like. Host/EC throttle control module 314 can also determine information about IHS 104, such as a percentage of the batteries 310 and 320 that is charged, an operation mode of IHS 104, and the like.

If host/EC throttle control module 314 determines that wireless charging pad 102 is not compatible with the class of wireless charging module 106, the host/EC throttle control module can set a flag to cause wireless charger 120 not to receive power from the wireless charging pad. Host/EC throttle control module 314 can also notify the user, via a display device, that IHS 104 is not receiving power from wireless charging pad 102. If host/EC throttle control module 314 determines that wireless charging pad 102 is compatible with wireless charging module 106, host/EC throttle control module 314 can determine an amount of power that is available from the wireless charging pad. If host/EC throttle control module 314 determines that the maximum amount of power available from wireless charging pad 102 is less than the amount needed to operate IHS 104 at maximum power, host/EC throttle control module may modify an operating mode of IHS 104, such as operating below the maximum power.

For example, host/EC throttle control module 314 can cause IHS 104 to enter a standby or low power mode in response to determining that the maximum amount of power available from wireless charging pad 102 is substantially less than the amount needed by the IHS. Host/EC throttle control module 314 may cause IHS 104 to remain in the low power mode while battery 310 is charged to a high enough capacity to operate the IHS. In another embodiment, host/EC throttle control module 314 may reduce the operational mode of IHS 104, such that the voltage supplied to the central processing unit, the memory, and other components of IHS 104 is reduced.

If host/EC throttle control module 314 determines that wireless charging pad 102 can provide more power than needed by IHS 104 for maximum operation power, host/EC throttle control module may determine a power state needed for IHS 104 and may send the power state to throttle control module 306. When throttle control module 306 receives the power state from host/EC throttle control module 314, the throttle control module can determine an operation level for wireless charging pad 102. Throttle control module 306 may then send the operation level to source-to-load limit control module 304, which in turn can determine an amount of power to be provided by wireless power source 108. Source-to-load limit control module 304 may send a signal to wireless power source 108 to set the power level for the wireless power source to provide to IHS 104 via antenna 110.

Wireless charger 120 may receive power from antenna 118 and it may provide the power to the battery 310, voltage regulator(s) 312, and/or battery 320. While wireless charging module 106 is receiving power from wireless charging pad 102, host/EC throttle control module 314 may continually monitor the operational mode of IHS 104 and adjust the power state provided to throttle control module 306. For example, IHS 104 may operate in a maximum power mode, and may switch to a low power mode such that IHS 104 does not need the same amount of power. The power state can indicate the amount of power to be provided to wireless charging module 106 connected IHS 104. In this situation, host/EC throttle control module 314 may determine a new power state and send the new power state to throttle control module 306, which in turn can adjust the operation level of wireless charging pad 102. The change in the operation level of wireless charging pad 102 may result in a change in the amount of power provided to IHS 104.

If wireless charging pad 102 cannot provide the amount of power requested by Host/EC throttle control module 314 or any amount of power to IHS 104, the wireless charging pad can send information to host/EC throttle control module 314 to indicate the current power available. Host/EC throttle control module 314 can then set a flag to indicate that a certain amount of power cannot be received from wireless charging pad 102. Host/EC throttle control module 314 may also set a flag when battery 310 is fully charged, and another flag when battery 320 is fully charged. Host/EC throttle control module 314 may then send information to throttle control module 306 to indicate that IHS 104 does not currently need power from wireless charging pad 102.

When IHS 104 and wireless charging module 106 are no longer in communication with wireless charging pad 102, host/EC throttle control module 314 can clear any flags set. Thus, if IHS 104 begins to communicate with wireless charging pad 102 again, the communication and setup between host/EC throttle control module 314 and throttle control module 306 can restart as described above. In another embodiment, when IHS 104 is no longer in communication with wireless charging pad 102, host/EC throttle control module 314 can continue to maintain flags indicating that batteries 310 and 320 are fully charged until a point in time, if any, that one or both of the batteries becomes less than fully charged.

High efficiency wireless charging creates limits on alignment between the transmitter and receiver coils of antennas 110 and 118, respectively. Coil alignment and freedom of placement play a role in cost, ease of charging and power limits. In some situations, charging will not engage as wireless charging pad 102 shuts off due to the placement of IHS 104 not meeting full power delivery specifications; in which case all power ordinarily stops being delivered. It may be desirable in come cases, however, to offer reduced power levels to slow or trickle charge without optimal alignment. Having a wider or "free" placement with reduced power delivery allows for more settings in this ease of use and power transfer.

To address these, and other problems, systems and methods described herein allow for increased placement freedom at lower alignment points. Convention starts with a high voltage (19.5-20.5 V) and good antenna or coil alignment, which is maintained through the charging period. In contrast with these conventions, however, techniques described herein allow the load and VA (volt-ampere; the unit used for the apparent power in an electrical circuit, which is equal to the product of root-mean-square (RMS) voltage and RMS current) to drift in order to match the realities of coils 110 and 118; generally this control is downward (5-15 V) and allows not shutting off the regulation due to droop.

Staying on, regardless of placement, increases the working area by including "dark" regions or positions on the surface of wireless charging pad 102 where charging would not typically work. As such, techniques described herein enable poor placement and some "fringe" or marginal power to be provided, offering standby or auxiliary power to alert the user of a problem or error in IHS 104 (e.g., display, processor, battery, etc.). Additionally or alternatively, the techniques described herein may be used to charge the IHS' battery 310 (taking a longer amount of time than usual). Some batteries, for example, only need ~9 V to charge properly, hence holding the 19.5 V to tight tolerance is not always required.

Figure 4:
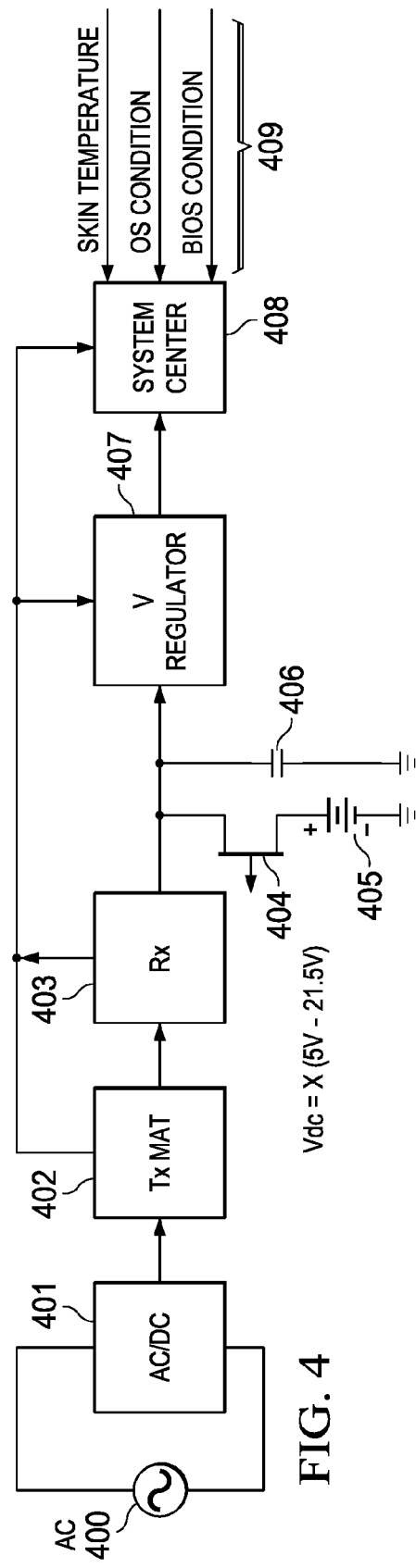
FIG. 4 is a block diagram of an example of a system for device placement for wireless charging according to some embodiments.

FIG. 4 is a block diagram of an example of a system for device placement for wireless charging according to some embodiments. As shown, AC/DC converter circuit 401 is coupled to AC source 400 and to power transmitter 402; which may be implemented in part by wireless power source 108 and antenna or coil 110 of system 100. On the IHS 104 side, power receiver 403 (e.g., antenna or coil 118) is coupled to power transmitter 402 and to an output stage modeled as transistor 404, voltage source 405, and capacitor 406. Capacitor 406 is coupled to voltage regulator 407, which in turn is coupled to system center 408.

System center 408 may be configured to receive information regarding a number of system conditions 409, such as, for example, the temperature of one or more components (e.g., a processor core), Operating System conditions (e.g., pending turbo requests), BIOS conditions (e.g., upcoming turbo window), and battery conditions (e.g., amount of charge stored). In some cases, system center 408 may be implemented by a processor of IHS 104 executing a set of instructions effecting various techniques described herein. Generally speaking, system center 408 may create a feedback loop (e.g., using an out-of-band communication channel such as via a Bluetooth connection or the like) with power transmitter 402 to request that power continue to be provided to receiver 403 even when IHS 104 is sub-optimally positioned upon the surface of wireless charging pad 102.

Figure 5:
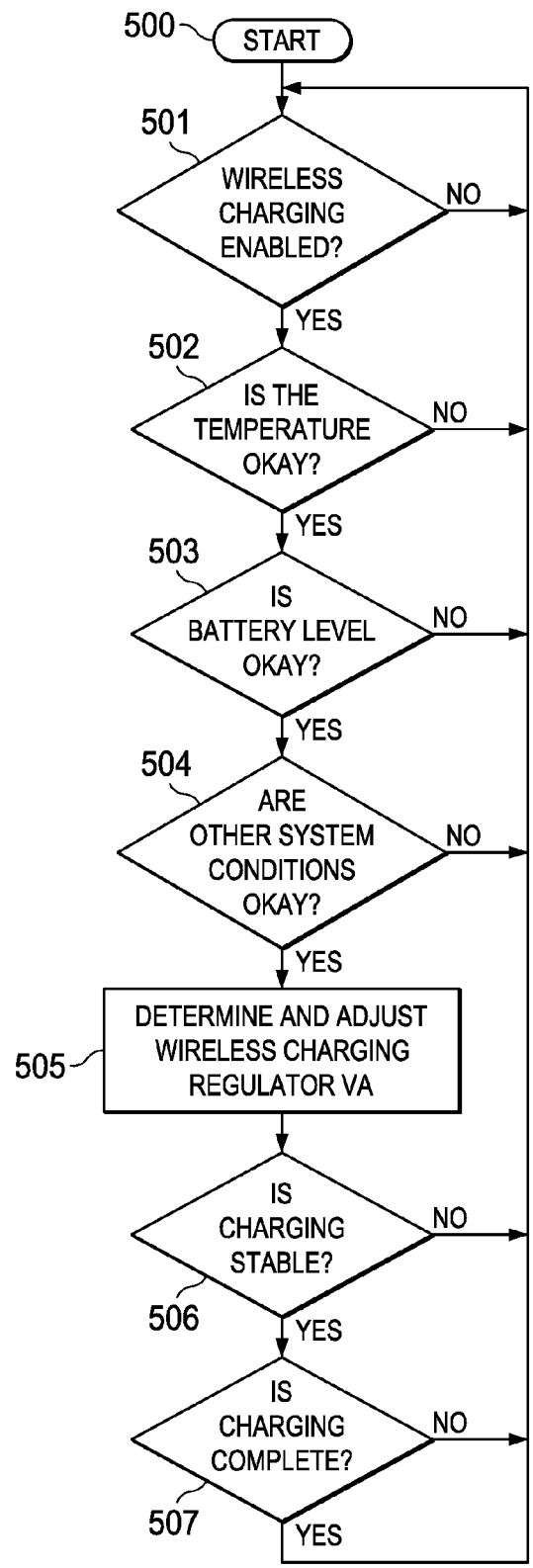
FIG. 5 is a flowchart of an example of a method for device placement for wireless charging according to some embodiments.

FIG. 5 is a flowchart of an example of a method for free device placement for wireless charging, which begins at block 500. In various embodiments, the method of FIG. 5 may be performed, at least in part, by IHS 104 and/or wireless charging pad 102. At block 501, the method determines whether wireless charging is enabled. If so, block 502 determines whether the temperature of IHS 104 is within pre-determined bounds. Then, at block 503, the determines whether the battery level is acceptable. In some cases, block 503 may determine that battery 310 is not at charged sufficiently to provide any power to IHS 104 or that the charge available is not sufficient to enable IHS 104 to indicate the existence of a problem or error to the user. At block 504, the method determines whether other conditions 409 (e.g., user-selected) are also met.

If all conditions of blocks 501-504 are met, block 505 may determine and adjust a wireless charging regulator's VA. For example, block 505 may first determine that IHS 104 is placed in a position on a wireless charging pad such that wireless charging pad 102 cannot provide power to the IHS above a minimum threshold value. In some cases, this threshold value may be a minimum value prescribed by an industry standard otherwise followed by IHS 104 and/or wireless charging pad 102 such that, in the absence of the embodiments discussed herein, the wireless charging pad's inability to provide power above that value would ordinarily cause all wireless charging to cease.

In some cases, determining that wireless charging pad 102 cannot provide power to the IHS above a minimum threshold value may include identifying a first amount of power output by wireless charging pad 102, identifying a second amount of power received by IHS 104, and determining that a ratio between the second and first amounts of power is under a minimum value. To make these determinations, system center 408 may be configured to receive information from transmitter 402, receiver 403, and/or regulator 407. Despite the determination that wireless charging pad 102 cannot provide power to IHS 104 above a minimum threshold value, bock 505 may continue to provide a smaller or "fringe" amount of power to IHS 104.

At block 506, the method may determine whether fringe charging is stable. For example, in several implementations, block 506 may determine that the fringe power provided to IHS 104 (without repositioning IHS 104 on wireless charging pad 102) is being received by IHS 104, even when the fringe power is smaller than the minimum threshold power level that would otherwise be required for charging to take place at all (e.g., under the industry standard). At block 507, the method determines whether charging is complete and, if so, the method ends. Otherwise control returns to block 501.

In various embodiments, upon a determination in block 505 that the minimum threshold value is not met, IHS 104 may request that wireless charging pad 102 continue to provide fringe power to IHS 104 by outputting its maximum amount of available power through coil or antenna 110. Then IHS 104 may use the fringe power to indicate a problem or error to a user using limited resources.

In some cases, for instance, IHS 104 may include one or more LEDs in its chassis that can be lit up using the fringe power to provide a discrete visual indicator on the IHS that identifies a type of the problem or error to the user. Additionally or alternatively, using the fringe power may include making a sound by the IHS that identifies a type of the problem or error to the user. As such, an indication of the problem or error (e.g., display, battery, processor, etc.) may be presented to the user even when the IHS's monitor cannot be powered on (e.g., battery 310 is depleted and the power delivered by wireless charging mat 102 is not sufficient to turn the monitor on). Additionally or alternatively, the indication of the problem or error may include an indication that IHS 104 be repositioning on the surface wireless charging pad 102 to increase the efficiency of the power transfer between the two.

FIG. 6 shows an example of IHS 600 configured to implement IHS 104 described herein according to some embodiments. It should be appreciated that although certain embodiments described herein may be discussed in the context of a desktop or server computer, other embodiments may be utilized with virtually any type of IHS. Particularly, IHS 600 includes a baseboard or motherboard, which is a printed circuit board (PCB) to which components or devices are coupled by way of a bus or other electrical communication path. For example, central processing unit ("CPU") 602 operates in conjunction with a chipset 604; CPU 602 is a standard central processor that performs arithmetic and logical operations necessary for the operation of IHS 600.

Chipset 604 includes northbridge 606 and southbridge 608. Northbridge 606 provides an interface between CPU 602 and the remainder of IHS 600. Northbridge 606 also provides an interface to a random access memory (RAM) used as main memory 614 in IHS 600 and, possibly, to on-board graphics adapter 612. Northbridge 606 may also be configured to provide networking operations through Ethernet adapter 610. Ethernet adapter 610 is capable of connecting IHS 600 to another IHS (e.g., a remotely located IHS) via a network. Connections which may be made by network adapter 610 may include local area network (LAN) or wide area network (WAN) connections. Northbridge 606 is also coupled to southbridge 608.

Southbridge 608 is responsible for controlling many of the input/output (I/O) operations of IHS 600. In particular, southbridge 608 may provide one or more universal serial bus (USB) ports 616, sound adapter 624, Ethernet controller 634, and one or more general purpose input/output (GPIO) pins 618. Southbridge 608 may also provide a bus for interfacing peripheral card devices such as BIOS boot system-compliant SCSI host bus adapter 630 having option ROM 631. In some embodiments, the bus may include a peripheral component interconnect (PCI) bus. Southbridge 608 may also provide baseboard management controller (BMC) 632 for use in managing the various components of IHS 600. Power management circuitry 626 and clock generation circuitry 628 may also be utilized during the operation of southbridge 608.

Southbridge 608 is further configured to provide one or more interfaces for connecting mass storage devices to IHS 600. For instance, in an embodiment, southbridge 608 may include a serial advanced technology attachment (SATA) adapter for providing one or more serial ATA ports 620 and/or an ATA100 adapter for providing one or more ATA 100 ports 622. Serial ATA ports 620 and ATA100 ports 622 may be, in turn, connected to one or more mass storage devices storing an operating system (OS) and application programs. An OS comprises a set of programs that control operations of IHS 600 and allocation of resources. An application program is software that runs on top of the OS and uses computer resources made available through the OS to perform application specific tasks desired by the user.

Mass storage devices connected to southbridge 608 and SCSI host bus adapter 630, and their associated computer-readable media provide non-volatile storage for IHS 600. Although the description of computer-readable media contained herein refers to a mass storage device, such as a hard disk or CD-ROM drive, it should be appreciated a person of ordinary skill in the art that computer-readable media can be any available media on any memory storage device that can be accessed by the IHS 600. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count ("LPC") interface may also be provided by southbridge 608 for connecting Super I/O device 638. Super I/O device 638 is responsible for providing a number of I/O ports, including a keyboard port, a mouse port, a serial interface, a parallel port, and other types of input/output ports. The LPC interface may also connect a computer storage media such as a ROM or a flash memory such as a non-volatile random access memory (NVRAM) for storing firmware 636 that includes program code containing the basic routines that help to start up IHS 600 and to transfer information between elements within IHS 600. EFI firmware 636 comprises a firmware that is compatible with the EFI Specification and the Framework.

The LPC interface may also be utilized to connect NVRAM 637 to IHS 600. NVRAM 637 may be utilized by firmware 636 to store configuration data for IHS 600. In other embodiments, configuration data for IHS 600 may be stored on the same NVRAM 637 as the firmware 636.

BMC 632 may include non-volatile memory having program instructions stored thereon that are usable by CPU(s) 602 to enable remote management of IHS 600. For example, BMC 632 may enable a user to discover, configure, and manage BMC 632, setup configuration options, resolve and administer hardware or software problems, etc. Additionally or alternatively, BMC 632 may include one or more firmware volumes, each volume having one or more firmware files used by the BIOS' firmware interface to initialize and test components of IHS 600.

As a non-limiting example of BMC 632, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within IHS 600 from the factory.

It should be appreciated that, in other embodiments, IHS 600 may comprise other types of computing devices, including hand-held computers, embedded computer systems, personal digital assistants, and other types of computing devices. It is also contemplated that the IHS 600 may not include all of the components shown in FIG. 6, may include other components that are not explicitly shown in FIG. 6, or may utilize an architecture different than that shown in FIG. 6.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory having program instructions stored thereon that, upon execution by the processor, cause the IHS to:
   determine that the IHS is placed in a position on a wireless charging pad such that the wireless charging pad cannot provide power to the IHS above a minimum threshold value;
   request that the wireless charging pad provide fringe power to IHS without repositioning the IHS on the wireless charging pad, wherein the fringe power is smaller than the minimum threshold power level; and
   use the fringe power to indicate a problem or error to a user.

2. The IHS of claim 1, wherein in the absence of the request, the wireless charging pad provides no power to the IHS.

3. The IHS of claim 1, further comprising a battery coupled to the processor and to the memory, wherein the battery is configured to be charged by the wireless charging pad, and wherein the battery does not have sufficient energy stored therein to enable to IHS to indicate the problem or error to the user.

4. The IHS of claim 1, wherein determining that the wireless charging pad cannot provide power to the IHS above a minimum threshold value includes identifying a first amount of power output by the wireless charging pad, identifying a second amount of power received by the IHS, and determining that a ratio between the second and first amounts of power is under a minimum value.

5. The IHS of claim 1, wherein requesting that the wireless charging pad continue to provide fringe power to IHS includes requesting that the wireless charging pad provide its maximum amount of available power to the IHS.

6. The IHS of claim 1, wherein using the fringe power includes lighting up a discrete visual indicator on the IHS that identifies a type of the problem or error to the user.

7. The IHS of claim 1, wherein using the fringe power includes making a sound by the IHS that identifies a type of the problem or error to the user.

8. The IHS of claim 7, wherein the problem or error includes a display error.

9. The IHS of claim 7, wherein the problem or error includes a battery error.

10. The IHS of claim 7, wherein the indication of the problem or error includes an indication that the IHS be repositioning on the wireless charging pad.

11. A wireless power adaptor, comprising:
    a power source; and
    a wireless charging pad coupled to the power source, the wireless charging pad configured to:
    determine that an Information Handling System (IHS) is placed in a position on the surface of the wireless charging pad such that the IHS cannot receive power from the wireless charging pad above a minimum threshold value;
    receive a request to provide fringe power to IHS without repositioning the IHS on the wireless charging pad, wherein the fringe power is smaller than the minimum threshold power level; and
    provide the fringe power to the IHS in response to the request.

12. The wireless power adaptor of claim 11, wherein determining that the IHS cannot receive power above a minimum threshold value includes identifying a first amount of power output by the wireless charging pad, identifying a second amount of power received by the IHS, and determining that a ratio between the second and first amounts of power is under a minimum value.

13. The wireless power adaptor of claim 11, wherein providing the fringe power to the IHS includes requesting that the wireless charging pad provide its maximum amount of available power to the IHS.

14. The wireless power adaptor of claim 11, wherein the IHS is configured to use the fringe power to (a) light up a discrete visual indicator on the IHS or to (b) make a sound that identifies a type of the problem or error to the user.

15. The wireless power adaptor of claim 14, wherein the problem or error includes a display error, a processor error, or a battery error.

16. The wireless power adaptor of claim 11, the wireless charging pad configured to:
provide an indication that the IHS be repositioned on the wireless charging pad while providing the fringe power;
determine that the IHS has been repositioned on the surface of the wireless charging pad; and
negotiate, with the IHS, another amount of power to be provided to the IHS that is above the minimum threshold value.

17. A method comprising:
in response to a determination that an Information Handling System (IHS) is placed on a wireless charging pad in a position such that the wireless charging pad cannot provide power to the IHS above a minimum threshold value, allowing the wireless charging pad provide fringe power to IHS without repositioning the IHS on the wireless charging pad, wherein the fringe power is smaller than the minimum threshold power level; and
using the fringe power, by the IHS, to indicate a problem or error to a user without using a monitor, wherein the IHS includes a battery that does not have sufficient energy stored therein to enable the IHS to indicate the problem or error to the user via the monitor.

18. The method of claim 17, further comprising determining that the IHS cannot receive power above a minimum threshold value by identifying a first amount of power output by the wireless charging pad, identifying a second amount of power received by the IHS, and determining that a ratio between the second and first amounts of power is under a minimum value, wherein providing the fringe power to the IHS includes providing, by the wireless charging pad, the maximum amount of power that can be provided by the wireless charging pad.

19. The method of claim 17, wherein using the fringe power includes: (a) lighting up a discrete visual indicator on the IHS or (b) making a sound that identifies a type of the problem or error to the user.

20. The method of claim 19, wherein the type of problem or error includes a battery error.

* * * * *